L. SPERRY & L. ROBINSON.

Cradles.

No. 5,331. Reissued March 18, 1873.

Witnesses:

J. H. Shumway

A. J. Tibbits

Lewis Sperry & Adelia Sperry
assignees of
Lewis Sperry & Lester Robinson
Inventors.

By Attys.

Thos. S. Earle

AM. PHOTO-LITHOGRAPHIC CO. N.Y. (OSBORNE'S PROCESS.)

UNITED STATES PATENT OFFICE.

LEWIS SPERRY, OF EAST WINDSOR HILL, AND LESTER ROBINSON, OF NEW HAVEN, CONN., ASSIGNORS TO LEWIS SPERRY AND ADELIA SPERRY.

IMPROVEMENT IN CRADLES.

Specification forming part of Letters Patent No. 92,896, dated July 20, 1869; reissue No. 5,331, dated March 18, 1873.

*To all whom it may concern:*

Be it known that LEWIS SPERRY, of East Windsor Hill, in the county of Hartford and State of Connecticut, and LESTER ROBINSON, of New Haven, in the county of New Haven and State aforesaid, have invented a new and useful Improvement in Cradles and other articles requiring a rocking or vibrating motion; and we do hereby declare the following, when taken in connection with the accompanying drawing and the letters of reference marked thereon, to be a full, clear, and exact description of the same, and which said drawing constitutes part of this specification, and represents, in—

Figure 1:
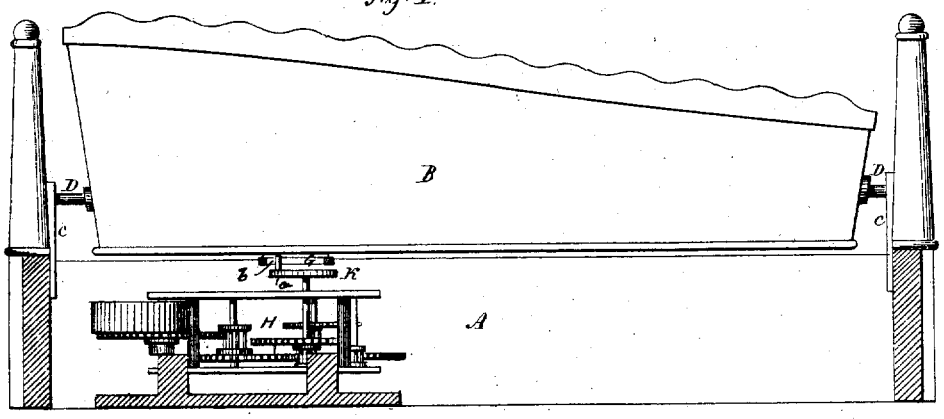
Figure 2:
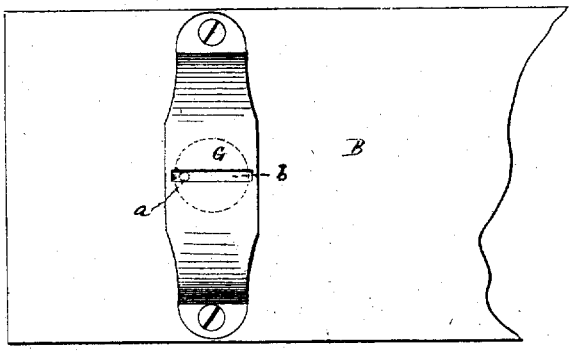

Figure 1, a side view as applied to a cradle, and in Fig. 2 an inverted view of the plate in the slot of which the crank-pin works.

This invention relates to the method of imparting the rocking or vibrating motion to cradles, applicable also to imparting the same motion to other articles; and it consists in combining with a stationary clock-work driving a crank a slot upon the thing to which a rocking or reciprocating motion is to be imparted, so that the crank-pin, working in the said slot, moves the thing to which the slot is attached back and forth transversely to the length of the said slot.

A is the frame, supporting the cradle B on bearings D so that the cradle will rock, turning upon the said bearings. Beneath the cradle a clock-work, H, is arranged, similar to the clock-work usually employed for moving mechanical toys, and this clock-work, when the spring is wound, causes the crank K to revolve. The crank-pin *a* works in a slot, *b*, here represented as formed in a plate, B, and attached to the bottom of the cradle. This slot runs parallel, or nearly so, to the axis of vibration, the length of the slot being equal to the full throw of the crank; hence the crank-pin working therein will carry the slot with it back and forth at each revolution, and transversely to the axis of vibration, thus giving to the cradle the requisite rocking or vibrating movement.

This invention is applicable in like manner to all mechanical toys in which a similar rocking or vibrating motion is desirable; we therefore do not wish to confine ourselves to the use of this invention for cradles only.

We claim as the invention of the said LEWIS SPERRY and LESTER ROBINSON—

In combination with a clock-work driving a crank, K, a slot, *b*, formed in or attached to the thing to be vibrated, the crank-pin *a* working in the said slot to cause the said slot to move transversely to the axis of vibration, substantially as described.

LEWIS SPERRY,
ADELIA SPERRY,
*Assignees of Lewis Sperry and Lester Robinson.*

Witnesses to LEWIS SPERRY:
D. H. KELLOGG,
H. O. PEASE.
Witnesses to A. SPERRY:
JOHN E. EARLE,
A. J. TIBBITS.